Patented Apr. 15, 1930

1,754,358

UNITED STATES PATENT OFFICE

ROBERT GRIESSBACH, OF LUDWIGSHAFEN-ON-THE-RHINE, AND OTTO SCHLIEPHAKE, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF POTASSIUM-AMMONIUM SULPHATE

No Drawing. Application filed August 23, 1928, Serial No. 301,707, and in Germany September 16, 1927.

It is known to produce a mixed fertilizer containing nitrogen and potassium by mixing potassium chloride with ammonium sulphate, other fertilizing salts being added, if desired. Such a mixed fertilizer, however, contains considerable amounts of chlorids, the presence of which is adverse to its general application, since the content of chlorids is obnoxious to many plants. Moreover the said mixtures are liable to cake and harden especially when produced by mixing in the solid state.

We have now found that a valuable fertilizer containing nitrogen and potassium and not exhibiting the above mentioned drawbacks is obtained in a simple manner by acting on solid potassium bisulphate with gaseous ammonia. The reaction may be carried out at ordinary temperature but also while slightly warming; preferably the process is first performed at ordinary temperature and the reaction mixture afterwards warmed for a short time. When working, however, while warming, neither the melting temperature of the potassium bisulphate nor that of the potassium ammonium sulphate formed should be attained. The process is best carried out while moving the reaction mixture for instance in a revolving furnace. The excess of ammonia not consumed in the reaction can be reintroduced in the furnace in a circular course.

The product thus obtained which contains only small amounts of impurities, corresponds about to the formula $KNH_4SO_4$ and has a content of nitrogen up to about 10 per cent and a content of potassium between about 30 to 35 per cent of $K_2O$. The reaction product is dry as dust, does neither cake nor smell and contains no components obnoxious to the plants. It is therefore an excellent fertilizing salt which may be mixed with other fertilizing salts in any desired amount.

Potassium bisulphate practically free from chlorine which can advantageously be used according to our invention can be produced at comparatively low temperatures, by passing a current of a hot gas or vapor, such as superheated steam, while stirring, through a mixture of potassium chlorid and sulfuric acid, preferably an acid of 50° to 60° Bé. strength in the relative proportions of 1 molecular proportion of potassium chlorid to at least 1 molecular proportion of sulfuric acid, at an elevated temperature but not higher than 120° C. and preferably at from about 110° C. to 120° C.

The heating of the mixture can be effected in any known or suitable manner, as for example by suitably superheating the introduced current of steam. The conversion proceeds rapidly and quantitatively, and care should preferably be taken to replenish the evaporated water by the addition of fresh water or steam, until the hydrochloric acid formed during the conversion has been completely driven off. Finally the crystal pulp is gradually thickened, by evaporating the water, so that, after being withdrawn from the reaction vessel, the mass sets to solid potassium bisulphate.

With suitable apparatus the present process may also be carried on in a continuous manner.

The following examples will further illustrate the nature of the said invention which however is not limited thereto.

Example 1

Gaseous ammonia is passed at ordinary temperature over 100 kilograms of potassium bisulphate, containing 28.6 per cent of potassium and 70.5 per cent of $SO_4$, in a revolving furnace. The salt grows warm by the heat of reaction. When the reaction is nearly complete the furnace is kept for a short time at about 50° C. After about 3 hours the absorption of ammonia is complete and a dry spreadable product containing 25.6 per cent K, 11.8 per cent $NH_4$ and 62.6 per cent $SO_4$.

Example 2

375 kilograms of potassium chlorid are stirred into 750 kilograms of 50° Bé. sulfuric acid, and heated to 110° C., whereupon superheated steam is passed through the mass. By adding wet steam, the mixture becomes concentrated to the state of a viscous liquid only by the time it is perfectly free from chlorine, which will happen in from 30 to 40 minutes. If the reaction material be run out of the vessel and left to cool in the air, 650 kilograms of potassium bisulphate, practically free from chlorine, are obtained.

What we claim is:

1. A process of producing a mixed fertilizer containing nitrogen and potassium but free from chlorids which comprises treating solid potassium bisulphate with gaseous ammonia.

2. A process of producing a mixed fertilizer containing nitrogen and potassium but free from chlorids which comprises treating solid potassium bisulphate with gaseous ammonia at elevated temperature but below the melting point of the reaction mixture.

3. A process of producing a mixed fertilizer containing nitrogen and potassium but free from chlorids which comprises treating a mixture of one molecular proportion of potassium chlorid and at least one molecular proportion of sulfuric acid at elevated temperature but not higher than 120° C. with a current of gas until the hydrochloric acid formed is driven off, drying the resulting potassium bisulphate and treating it with gaseous ammonia.

4. A process of producing a mixed fertilizer containing nitrogen and potassium but free from chlorids which comprises treating a mixture of one molecular proportion of potassium chlorid and at least one molecular proportion of sulfuric acid with a current of superheated steam until the hydrochloric acid formed is driven off, drying the resulting potassium bisulphate and treating it with gaseous ammonia.

5. A process of producing a mixed fertilizer containing nitrogen and potassium but free from chlorids which comprises treating a mixture of one molecular proportion of potassium chlorid and at least one molecular proportion of sulfuric acid of between 50° and 60° Bé. strength at a temperature between 110° and 120° C. with superheated steam until the hydrochloric acid formed is driven off, drying the resulting potassium bisulphate and treating it with gaseous ammonia.

6. A process of producing a mixed fertilizer containing nitrogen and potassium but free from chlorids which comprises treating a mixture of one molecular proportion of potassium chlorid and at least one molecular proportion of sulfuric acid of between 50° and 60° Bé. strength at a temperature between 110° and 120° C. with a current of superheated steam the evaporating water being replenished until the hydrochloric acid formed is driven off, drying the resulting potassium bisulphate and treating it with gaseous ammonia.

7. A process of producing a mixed fertilizer containing nitrogen and potassium but free from chlorids which comprises treating a mixture of one molecular proportion of potassium chlorid and at least one molecular proportion of sulfuric acid of between 50° and 60° Bé. strength at a temperature between 110° and 120° C. with a current of superheated steam the evaporating water being replenished until the hydrochloric acid formed is driven off, drying the resulting potassium bisulphate and treating it with gaseous ammonia at elevated temperature but below the melting point of the reaction mixture.

8. As new article of manufacture potassium-ammonium sulphate corresponding substantially to the formula $KNH_4SO_4$.

In testimony whereof we have hereunto set our hands.

ROBERT GRIESSBACH.
OTTO SCHLIEPHAKE.